(12) United States Patent
Kobori

(10) Patent No.: US 6,973,583 B2
(45) Date of Patent: Dec. 6, 2005

(54) INFORMATION PROCESSING APPARATUS HAVING AN INTERRUPT FUNCTION

(75) Inventor: Tadayoshi Kobori, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 426 days.

(21) Appl. No.: 10/084,348

(22) Filed: Feb. 28, 2002

(65) Prior Publication Data

US 2003/0061425 A1    Mar. 27, 2003

(30) Foreign Application Priority Data

Sep. 27, 2001   (JP) ............................. 2001-295412

(51) Int. Cl.[7] .............................................. G06F 1/26
(52) U.S. Cl. ....................... 713/322; 710/260; 710/267
(58) Field of Search ................................ 710/260, 262, 710/267; 713/322, 320

(56) References Cited

U.S. PATENT DOCUMENTS

| 6,219,797 B1 * | 4/2001 | Liu et al. ..................... 713/500 |
| 6,732,284 B2 * | 5/2004 | Watts et al. ................. 713/322 |

* cited by examiner

Primary Examiner—Rehana Perveen
Assistant Examiner—Clifford Knoll
(74) Attorney, Agent, or Firm—Rabin & Berdo, P.C.

(57) ABSTRACT

The present invention aims to reduce a waiting time of an information processing machine from reception of an interrupt request signal to an actual start of an interrupt process. The information processing machine includes a CPU that normally operates with a first clock. The machine also includes a circuit for generating a second clock which is faster than the first clock. Upon receiving the second clock, a clock switching circuit of the machine supplies the second clock to the CPU instead of the first clock in order to cause the CPU to operate with the second clock. When an interrupt control circuit of the machine receives the interrupt request signal, it supplies a start signal to the CPU and the second clock generating circuit so as to cause the CPU to start preparation for the interrupt process and to cause the second clock generating circuit to produce the second clock.

19 Claims, 4 Drawing Sheets

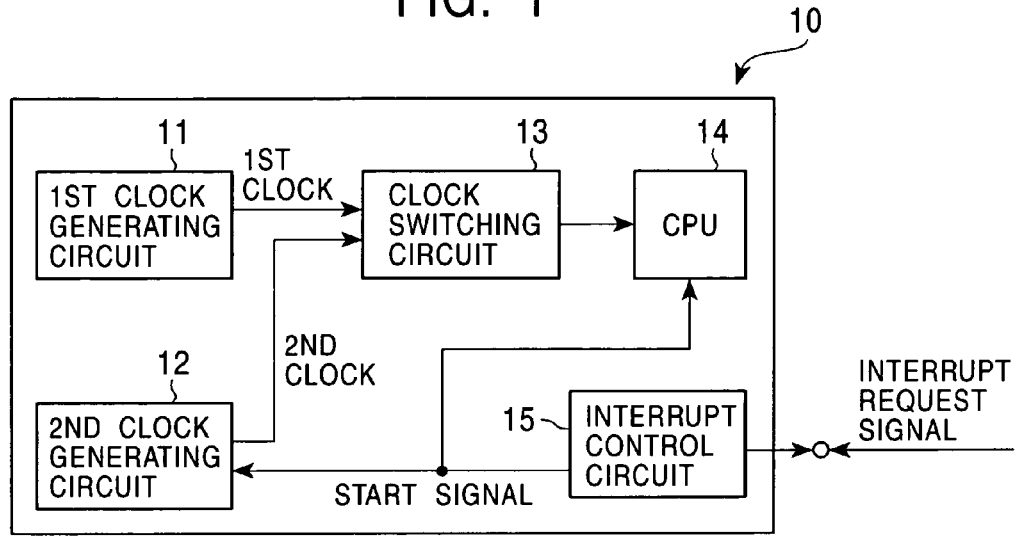
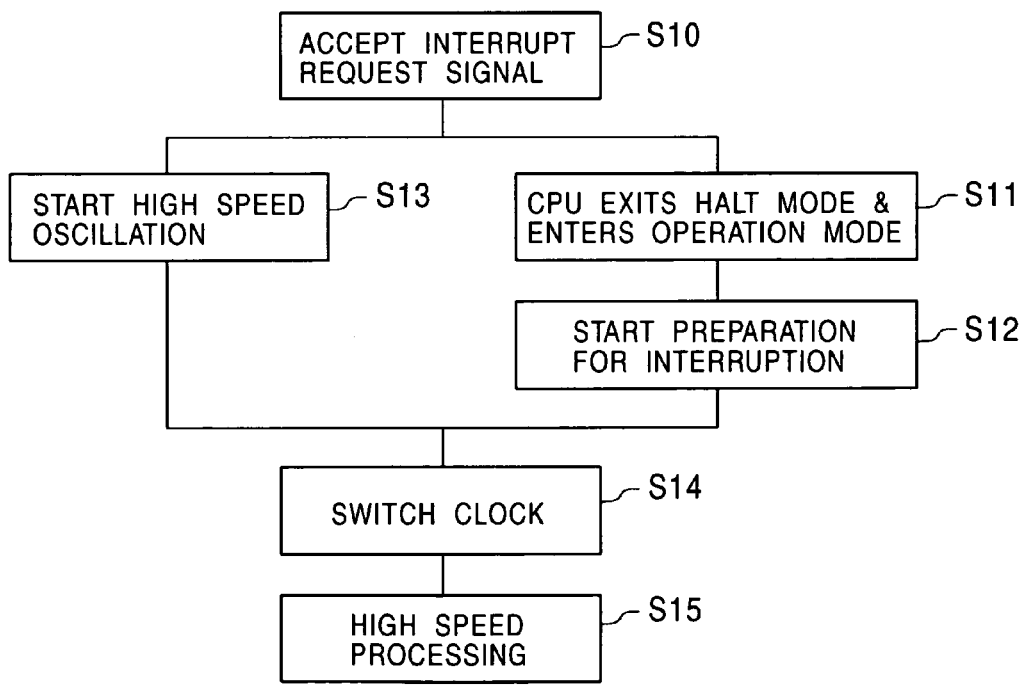

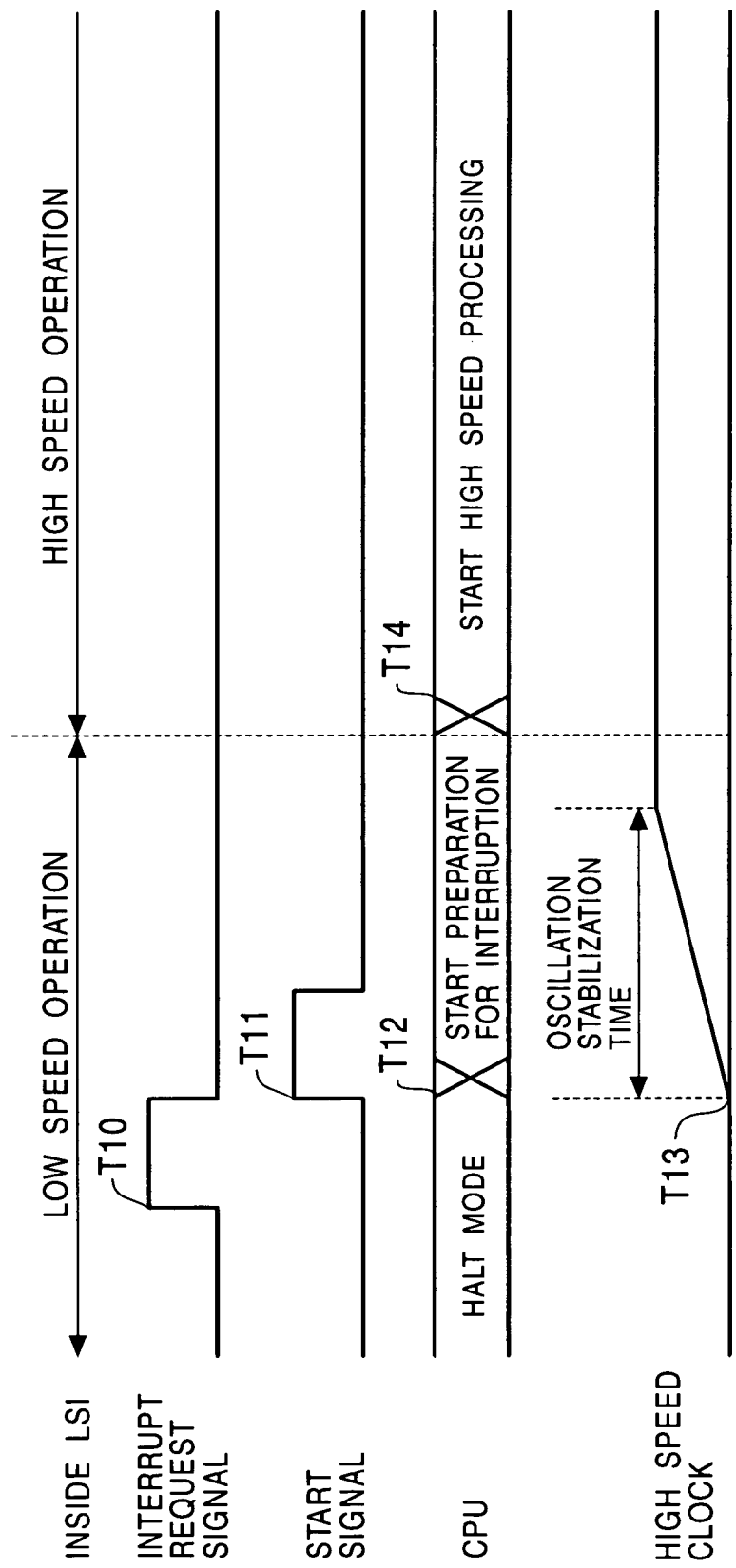

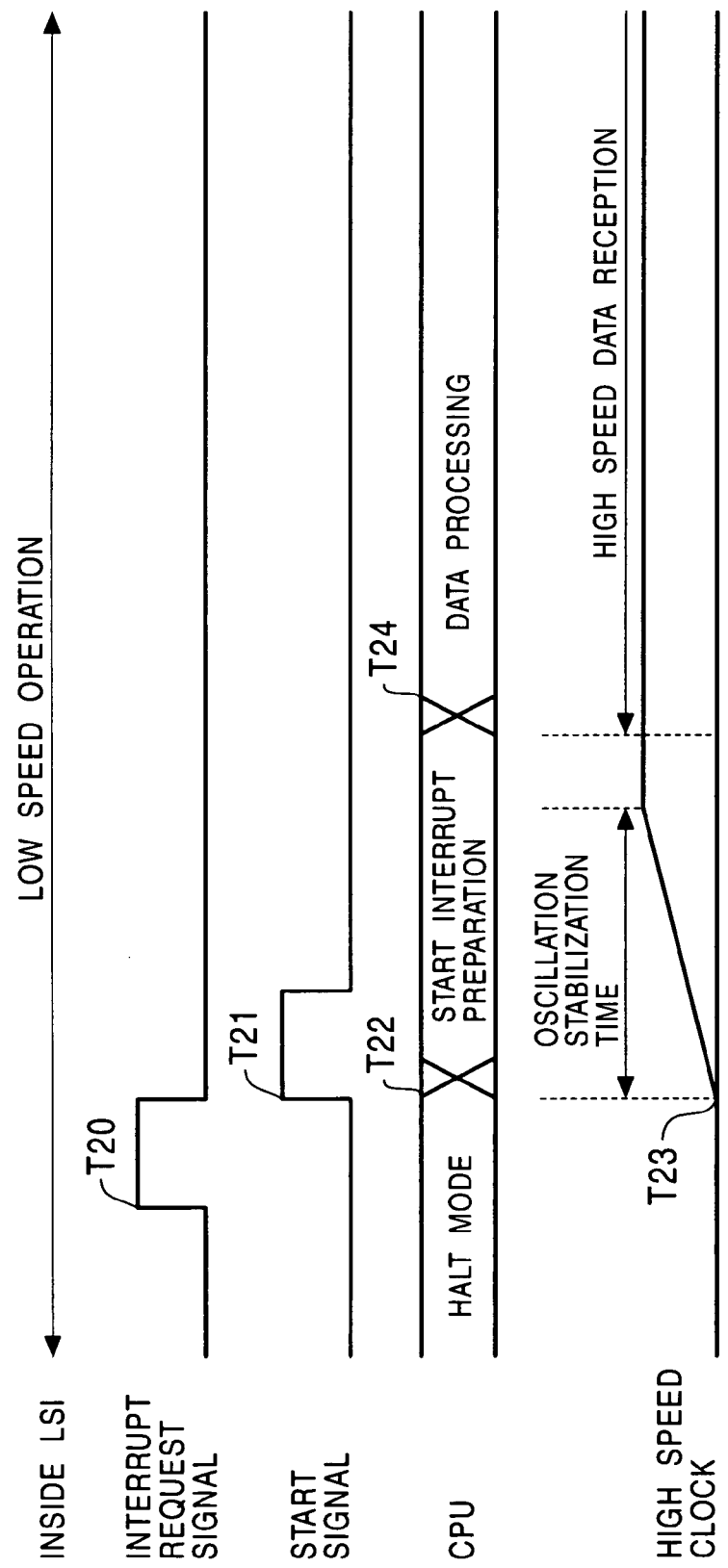

INFORMATION PROCESSING APPARATUS HAVING AN INTERRUPT FUNCTION

BACKGROUND OF THE INVENTION

1. Field of the Invention

The present invention relates to an information processing apparatus that operates with a clock having a shorter period than another clock having a predetermined period when the information processing apparatus receives an interrupt request signal.

2. Description of the Related Art

In order to reduce power consumption during a stand-by condition of an information processing apparatus, the information processing apparatus generally has a high speed clock generating circuit for generating a high speed clock and a low speed clock generating circuit for generating a low speed clock.

In the stand-by state, a low speed clock is supplied from the low speed clock generating circuit to a central processing unit (CPU) of the information processing apparatus so that power consumption is reduced. The high speed clock generating circuit is in a deactivated state when the low speed clock generating circuit is operating.

An interrupt request signal is sent to the information processing apparatus before data to be processed by the information processing apparatus is fed to the information processing apparatus. Upon receiving the interrupt request signal, the CPU of the information processing apparatus starts preparation for an interrupt operation. When the preparation is complete, the CPU outputs a control signal, as an oscillation start signal, to the high speed clock generating circuit via a clock switching circuit. The control signal is a signal to activate the high speed clock generating circuit. Upon receiving the oscillation start signal, the high speed clock generating circuit starts producing a high speed clock. The resulting high speed clock is supplied to the CPU via the clock switching circuit instead of the low speed clock. The CPU then starts a high speed operation to conduct the interruption.

In the information processing apparatus, the oscillation start signal is supplied to the high speed clock generating circuit from the CPU. During the preparation time from when the CPU accepts the interrupt request signal to when the CPU completes the preparation, therefore, the CPU does not issue the oscillation start signal. In addition, the high speed clock generating circuit produces a stabilized high speed clock when a certain time required for stabilizing the oscillation elapses after receiving the oscillation start signal. Consequently, the total waiting time from when the CPU receives the interrupt request signal to when the CPU receives the stable high speed clock and initiates the interruption includes the above-mentioned preparation time and the high speed clock stabilization time (i.e., oscillation stabilization time). The conventional information processing apparatus therefore requires a relatively long waiting time, which is the sum of the preparation time and oscillation stabilization time, until starting the interruption after receiving the interrupt request signal.

SUMMARY OF THE INVENTION

An object of the present invention is to provide an information processing apparatus that can reduce a waiting time from reception of an interrupt request signal till an actual start of interruption.

According to one aspect of the present invention, there is provided an information processing apparatus that can perform interruption comprising a central processing unit (CPU) that operates with one of a first and second clock, a second clock generating circuit for generating the second clock upon receiving a start signal, a clock switching circuit for normally supplying the first clock to the central processing unit to cause the central processing unit to operate with the first clock and for supplying the second clock, instead of the first clock, to the central processing unit to cause the central processing unit to operate with the second clock if a predetermined condition is met, and an interrupt control circuit for supplying the start signal to both the central processing unit and the second clock generating circuit when the interrupt control circuit receives an interrupt request signal. The second clock has a shorter period than the first clock. The start signal is supplied to the second clock generating circuit without passing through the central processing circuit. The start signal is a signal to cause the second clock generating circuit to produce the second clock, and to cause the central processing unit to start the preparation for the interruption.

When the interrupt control circuit receives the interrupt request signal, it feeds the start signal to both the central processing unit and the second clock generating circuit at (substantially) the same time. When the central processing unit receives the start signal, it starts preparation to cope with a change over from the first clock to the second clock (i.e., preparation for the interruption). Meanwhile, when the second clock generating circuit receives the start signal, it starts producing the second clock. The clock switching circuit introduces the second clock, instead of the first clock, to the central processing unit when the predetermined condition is met; for instance, when the longer of the two times elapses, the time spent by the central processing unit for the first-clock-to-second-clock change over preparation, and the time spent for stabilization of the second clock generated by the second clock generating circuit.

Therefore, if the interrupt control circuit receives the interrupt request signal, the central processing unit initiates the preparation for the interruption at the same time the second clock generating circuit initiates the production of the second clock. In other words, the preparation for the interruption and the production of the second clock proceed in parallel. It is then possible for the central processing unit to perform the interruption (i.e., to process interruption data) when the central processing unit completes the interrupt preparation or the oscillation of the second clock becomes stable, whichever elapses later. This reduces the waiting time from the reception of the interrupt request signal to the start of the interrupt process as compared with the conventional apparatus.

According to another aspect of the present invention, there is provided an information processing apparatus that can perform interruption comprising a central processing unit (CPU) adapted to operate with a first clock, a second clock generating circuit for generating a second clock upon receiving an interrupt request signal, and an interrupt control circuit for storing interruption data in accordance with the second clock, and for supplying a start signal to the central processing unit upon receiving the interrupt request signal, to cause the central processing unit to start preparation of the interruption and feeding the interruption data to the central processing unit after the central processing unit completes the preparation of the interruption such that the central processing data performs the interruption with the interruption data. The second clock has a shorter period than the first clock.

When the interrupt control circuit receives the interrupt request signal, it outputs the start signal to the central processing unit so that the central processing unit is informed of the request for the interruption. Upon receiving the start signal, the central processing unit starts the preparation for the interruption in accordance with the first clock.

When the second clock generating circuit receives the interrupt request signal, on the other hand, it starts producing the second clock substantially at the same time the central processing unit starts the preparation for the interruption. The second clock generating circuit then supplies the second clock to the interrupt control circuit. It should be noted that the second clock oscillation needs a certain time for stabilization. When the interrupt control circuit receives the stabilized second clock, it operates in accordance with the second clock. The interrupt control circuit may have a storage to temporarily store the interruption data in accordance with the second clock. When the central processing unit completes the preparation for the interruption, the interrupt control circuit may successively transfer the interruption data to the central processing unit from the storage.

Therefore, as the interrupt control circuit and the second clock generating circuit receive the interrupt request signal, the central processing unit starts the preparation for the interruption and at the same time the second clock generating circuit starts the generation of the high-speed, second clock. As a result, the interruption preparation by the central processing unit and the stabilization of the second clock oscillation proceed in parallel. The interrupt control circuit can temporarily accept in the storage the interruption data, which is transmitted to the interrupt control circuit at a high speed, without waiting for completion of the interruption preparation of the central processing unit which operates with the low-speed, first clock. Since the interruption data is successively supplied to the central processing unit from the storage at an appropriate rate, the slowly operating central processing unit can yet process the interruption data without causing an overflow of data. The data overflow would possibly occur if the interruption data were directly supplied to the central processing unit at a high speed. The interrupt control circuit that operates with the second clock at a high speed (i.e., shorter period) can completely (i.e., without an overflow) receive the interruption data transmitted possibly at a high speed, independently of the completion of the interruption preparation in the central processing unit that operates with the first clock. The information processing apparatus can therefore obtain the interruption data in a secured manner. Since the central processing unit is operated with the first clock, the information processing apparatus can perform the interruption at low power consumption.

Since the interruption preparation by the central processing unit and the stabilization of the second clock oscillation proceed in parallel, the time from the reception of the interrupt request signal to the start of the interrupt process is reduced as compared with the conventional apparatus. Accordingly, the information processing apparatus can start the interrupt process earlier than the convention apparatus.

BRIEF DESCRIPTION OF THE DRAWINGS

FIG. 1 illustrates a block diagram of an information processing apparatus according to a first embodiment of the present invention;

FIG. 2 illustrates a flowchart of operation executed by the information processing apparatus shown in FIG. 1;

FIG. 3 illustrates a timing chart of operation executed by the information processing apparatus shown in FIG. 1;

FIG. 6 illustrates a timing chart of operation executed by the information processing apparatus shown in FIG. 4.

DETAILED DESCRIPTION OF THE INVENTION

Figure 4:
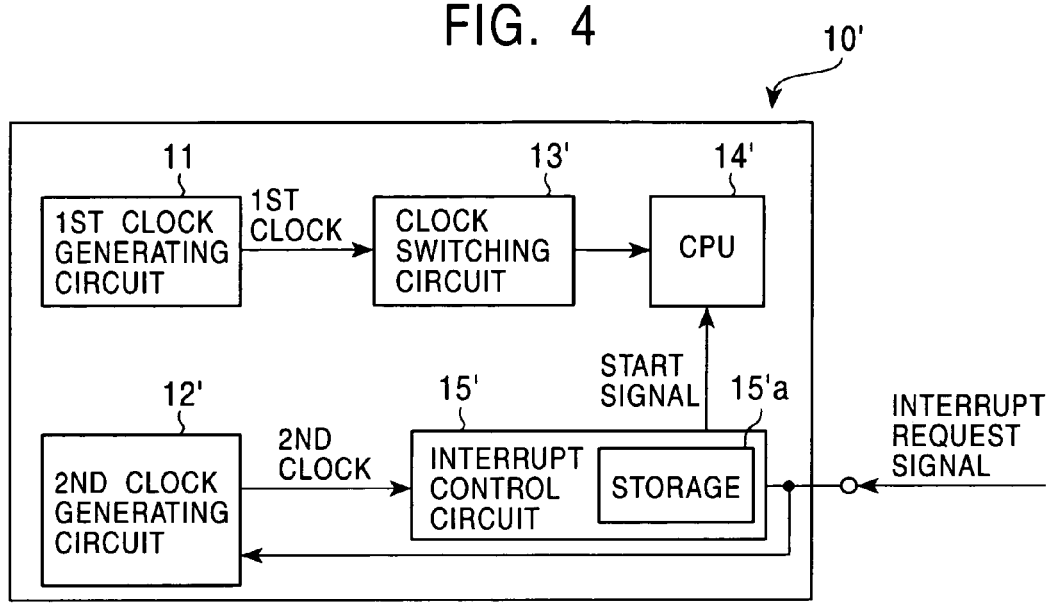
FIG. 4 illustrates a block diagram of an information processing apparatus according to a second embodiment of the present invention.

Embodiments of the present invention will be described in reference to the accompanying drawings.

First Embodiment

Referring to FIG. 1, illustrated is an information processing apparatus 10 according to a first embodiment of the present invention.

The information processing apparatus 10 is, for example, part of a well-known large-scale integrated circuit (LSI), which is incorporated in a semiconductor chip. The information processing apparatus 10 includes a first clock generating circuit 11 for generating a first clock, a second clock generating circuit 12 for generating a second clock faster than the first clock (i.e., having a shorter period than the first clock), a clock switching circuit 13 for receiving the first and second clocks and selectively outputting one of the first and second clocks, a central processing unit (CPU) 14 operated with the first or second clock supplied via the clock switching circuit 13, and an interrupt control circuit 15 for issuing a start signal to the CPU 14 and the second clock generating circuit 12 when the interrupt control circuit 15 receives an interrupt request signal from inside or outside of the LSI prior to reception of data to be processed in the information processing apparatus 10. The start signal is a signal to cause the CPU 14 to initiate preparation of the interruption and the second clock generating circuit 12 to initiate generation of the second clock.

The first clock generating circuit 11 is activated, for example, at the same time the information processing apparatus 10 is activated. The first clock is supplied to the CPU 14 from the first clock generating circuit 11 via the clock switching circuit 13. The CPU 14 receives the first clock and is kept in a stand-by condition when the CPU 14 is in a halt mode.

The second clock generating circuit 12 is in a non-oscillation state and does not produce a second clock when the CPU 14 is in the halt mode. If the second clock generating circuit 12 receives the start signal from the interrupt control circuit 15, the second clock generating circuit starts oscillating to produce a second clock.

Upon receiving the interrupt request signal, the interrupt control circuit 15 issues the start signal to the second clock generating circuit 12 so as to oscillate the second clock. At substantially the same time, the start signal is also introduced to the CPU 14 from the interrupt control circuit 15.

The CPU 14 accepts the start signal from the interrupt control signal 15 and starts the preparation for the interruption. When the CPU 14 completes the preparation for the interruption and the second clock oscillation from the second clock generating circuit 12 becomes stable, then the clock switching circuit 13 performs a switching operation to supply the second clock, instead of the first clock, to the CPU 14.

Operation of the information processing apparatus 10 will be described in reference to a flowchart shown in FIG. 2.

When the information processing apparatus 10 is in the stand-by state, the CPU 14 is in a stand-by condition or in a halt mode to suppress power consumption of the CPU 14. During the stand-by condition, if the interrupt control circuit 15 receives an interrupt request signal from, for instance, the outside of the LSI, the interrupt control circuit 15 supplies the start signal to the CPU 14 and the second clock generating circuit 12 to cause the CPU 14 to start the interruption preparation and the second clock generating circuit 12 to start the generation of the second clock (Step S10).

Upon receiving the start signal, the CPU 14 exits the halt mode and enters an operation mode (Step S11). In the operation mode, the CPU 14 starts the preparation for the interruption (Step S12).

Meanwhile, when the second clock generating circuit 12 receives the start signal, the second clock generating circuit 12 starts generating the second clock (Step S13).

The first clock is already supplied to the clock switching circuit 13 from the first clock generating circuit 11. Upon receiving the second clock from the second clock generating circuit 12, the clock switching circuit 13 switches the clock to be introduced to the CPU 14, from the first clock to the second clock when the longer of the two times elapses (Step S14). The two times are the oscillation stabilization time required by the second clock oscillation to become stable, and the preparation time required by the CPU 14 to finish the preparation for the interruption. In this particular embodiment, the preparation time is longer than the oscillation stabilization time. It should be noted that the preparation time may be shorter than the oscillation stabilization time in another configuration. It depends upon, for example, capabilities of the CPU 14 and the clock generating circuits.

The clock switching allows the CPU 14 to operate at a high speed (Step S15) so that the CPU 14 processes the interrupt data at a high rate.

The operation of the information processing apparatus 10 will be further described in reference to a timing chart shown in FIG. 3.

When the interrupt control circuit 15 admits the interrupt request signal (T10), the interrupt control circuit 15 feeds the start signal to both the second clock generating circuit 12 and the CPU 14 simultaneously (T11).

Upon receiving the start signal, the CPU 14 is brought into the active mode from the halt mode and starts the preparation for the interruption (T12).

When the second clock generating circuit 12 receives the start signal, on the other hand, the second clock generating circuit 12 starts producing the second clock (T13).

In the first embodiment, therefore, the information processing apparatus 10 initiates the preparation for the interruption and the production of the second clock at the same time, as understood from the timing chart of FIG. 3.

The clock switching circuit 13 performs the clock change over from the first clock to the second clock when the longer of the two times elapses. The two times are the time spent for the interrupt preparation and the time spent for the second clock stabilization.

As the clock change over is conducted by the clock switching circuit 13, the second clock is introduced to the CPU 14. The CPU 14 then performs the interruption at a high speed on the basis of the second clock (T14).

The start signal informing the start of the interrupt process is simultaneously supplied to the CPU 14 and the second clock generating circuit 12. In other words, the second clock generating circuit 12 receives the start signal directly from the interrupt control circuit 15, not via the CPU 14, and initiates the production of the short-period or high-speed clock upon receiving the start signal.

Consequently, the two times, i.e., the oscillation stabilization time required to stabilize the second clock oscillation and the preparation time required to enter the actual interrupt operation, proceed in parallel. Therefore, as the interrupt control circuit 15 receives the interrupt request signal, the second clock is supplied to the CPU 14 instead of the first clock when the longer of the oscillation stabilization time and the preparation time passes. The CPU 14 which receives the second clock performs the interrupt process on the basis of the second clock.

It should be remembered here that in the conventional information processing apparatus the second clock is supplied to the CPU instead of the first clock when the sum of the two times (the interrupt preparation time and the oscillation stabilization time) passes after receiving the interrupt request signal.

In the illustrated information processing apparatus 10, on the contrary, the second clock is supplied to the CPU 14 when the longer of the interrupt preparation time and the oscillation stabilization time passes after receiving the interrupt request signal. Accordingly, the time from the reception of the interrupt request signal to the start of the interrupt operation is reduced as compared with the conventional apparatus.

Although the information processing apparatus 10 of the above described embodiment receives the interrupt request signal when the CPU 14 is in the stand-by mode (i.e., the halt mode), the information processing apparatus 10 may be able to receive the interrupt request signal when the CPU 14 is in an active (or operation) mode to perform a certain operation.

It should be noted that the first clock generating circuit 11 may not be included in the information processing apparatus 10. More specifically, the information processing apparatus 10 may be supplied with the first clock from outside.

Second Embodiment

Referring to FIG. 4, illustrated is an information processing apparatus 10' according to a second embodiment of the present invention.

Like the first embodiment, the information processing apparatus 10' is part of an LSI and incorporated in a semiconductor chip. The information processing apparatus 10' includes a first clock generating circuit 11 for generating a first clock, a second clock generating circuit 12' for generating a second clock faster than the first clock, a clock change over circuit 13' for receiving the first clock, a central processing unit (CPU) 14' operated with the first clock supplied from the first clock generating circuit 11 via the clock change over circuit 13', and an interrupt control circuit 15' for issuing a start signal to the CPU 14' when the interrupt control circuit 15' receives an interrupt request signal from the inside or outside of the LSI prior to reception of data to be processed in the information processing apparatus 10'. The start signal is a signal to cause the CPU 14' to initiate preparation of the interruption. The interrupt control circuit 15' also has a storage 15'a to temporarily store interruption data on the basis of the second clock supplied from the second clock generating circuit 12'. The interrupt control circuit 15' accepts the interruption data after supplying the start signal to the CPU 14'. The interrupt control circuit 15' feeds the interruption data to the CPU 14'.

The CPU 14' receives the first clock from the first clock generating circuit 11 and operates in accordance with the first clock. The second clock generating circuit 12' generates the second clock (high speed clock) when the second clock generating circuit 12' receives the interrupt request signal. The interrupt request signal is directly introduced to the second clock generating circuit 12', not via the interrupt control circuit 15'.

As disclosed earlier, the interrupt control circuit 15' has the storage 15'a to temporarily store the interruption data (data to be processed in the interrupt operation). The interrupt control circuit 15' operates in accordance with the second clock supplied from the second clock generating circuit 12 such that the interruption data is reliably maintained in the storage unit 15'a without causing an overflow of data transmitted to the interrupt control circuit 15'.

Figure 5:
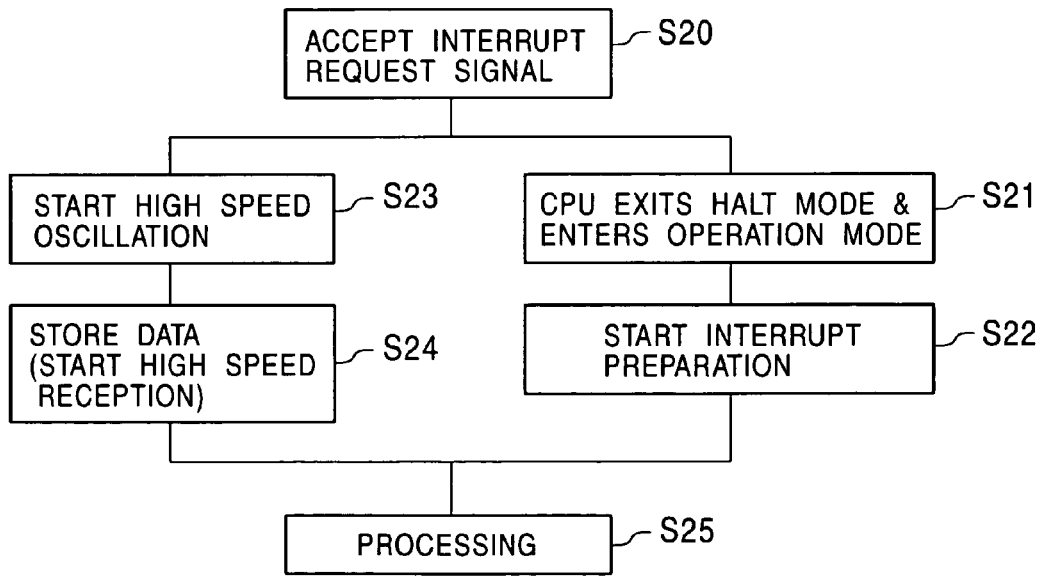
FIG. 5 illustrates a flowchart of operation executed by the information processing apparatus shown in FIG. 4.

Operation of the information processing apparatus 10' will be described in reference to a flowchart shown in FIG. 5. Like the first embodiment, the CPU 14' is in the halt mode at the beginning.

In the halt mode, if the interrupt control circuit 15' receives an interrupt request signal, the interrupt control circuit 15' supplies the start signal to the CPU 14' (Step S20) as in the first embodiment.

Unlike the first embodiment, the second clock generating circuit 12' does not receive the start signal (i.e., control signal via the interrupt control circuit 15'), but receives the interrupt request signal at the same time the interrupt control circuit 15' receives the interrupt request signal.

Upon receiving the start signal, the CPU 14' exits the halt mode and enters an operation mode (Step S21) as in the first embodiment.

In the operation mode, the CPU 14' starts the preparation for the interrupt process (Step S22) as in the first embodiment. Upon receiving the interrupt request signal, the second clock generating circuit 12' starts generating the second clock (Step S23).

After the oscillation stabilization time needed for stabilization of the second clock oscillation passes, the interrupt control circuit 15' receives the second clock from the second clock generating circuit 12' and starts receiving the interruption data in accordance with the second clock (Step S24). The interruption data is temporarily stored in the storage or memory unit 15'a.

The CPU 14' is successively supplied with the data temporarily stored in the storage 15'a and performs the interruption process in accordance with the first clock (Step S25).

The operation of the information processing apparatus 10' will be further described in reference to a timing chart shown in FIG. 6.

When the interrupt control circuit 15' receives the interrupt request signal (T20), the interrupt control circuit 15' feeds the start signal to the CPU 14' (T21).

Upon receiving the start signal, the CPU 14' is brought into the operation mode (active mode) from the halt mode and starts the preparation for the interruption (T22).

When the second clock generating circuit 12' receives the interrupt request signal at the same time the interrupt control circuit 15' receives the interrupt request signal, the second clock generating circuit 12' starts producing the second clock (T23).

In the second embodiment, therefore, the information processing apparatus 10' initiates the preparation for the interruption and the production of the second clock at substantially the same time, as understood from the timing chart of FIG. 6.

After stabilizing the oscillation of the second clock, the interrupt control circuit 15' accepts the interruption data in accordance with the second clock and temporarily stores the interruption data in the memory unit 15'a. When the CPU 14' completes the preparation for the interrupt process, the data stored in the memory unit 15'a is successively supplied to the CPU 14'. The CPU 14' performs the interruption in accordance with the first clock (low speed clock) in order to process the data successively supplied from the memory unit 15'a (T24).

Since the interrupt request signal is simultaneously introduced to both the interrupt control circuit 15' and the second clock generating circuit 12', the second clock generating circuit 12' starts producing the second clock in accordance with the interrupt request signal directly (not via the CPU 14') supplied to the second clock generating circuit 12'.

Like the first embodiment, the CPU 14' can start the preparation for the interruption at substantially the same time the second clock generating circuit 12' starts generating the high speed second clock. Consequently, it is possible to start the interrupt process earlier than the conventional apparatus, after receiving the interrupt request signal. Thus, the time from the reception of the interrupt request signal to the start of the actual interrupt operation is reduced as compared with the conventional apparatus.

Further, since the interrupt control circuit 15' operates with the high speed second clock when receiving the interruption data, it is possible for the interrupt control circuit 15' to receive all the interruption data without missing. In addition, since the CPU 14' operates with the low speed first clock when processing the interruption data, it is possible for the CPU 14' to perform the interruption with a decreased amount of power consumption.

It should be noted that the first clock generating circuit 11 may not be included in the information processing apparatus 10'. More specifically, the information processing apparatus 10' may be supplied with the first clock from outside.

It should also be noted that the clock switching circuit 13 shown in FIG. 1 can be used in the place of the clock switching circuit 13' in FIG. 2. The clock switching circuit 13' in FIG. 2 does not actually switch the clock. Therefore, the clock switching circuit 13' may be replaced with a time base counter (TBC). If the time base counter is employed, the clock switching circuit 13' may feed the first clock to a watch dog timer and/or a pulse width modulation circuit, in addition to the CPU 14'. Alternatively, the clock switching circuit 13' may be dispensed with because the clock switching circuit 13' merely transfers the clock to the CPU 14' from the first clock generating circuit 11.

What is claimed is:

1. An information processing apparatus that can perform an interruption function comprising:
   a central processing unit that operates with one of a first clock and a second clock, the second clock having a shorter period than the first clock;
   a clock generating circuit for generating the second clock upon receiving a start signal;
   a clock switching circuit for normally supplying the first clock to the central processing unit to cause the central processing unit to operate with the first clock, and for supplying the second clock, instead of the first clock, to the central processing unit to cause the central processing unit to operate with the second clock when a predetermined condition is present; and an interrupt control circuit for supplying the start signal substantially simultaneously to both the central processing unit and the clock generating circuit when the interrupt control circuit receives an interrupt request signal, the start signal being supplied to the clock generating circuit without passing through the central processing circuit, the start signal causing the central processing unit to start preparation for the interruption and additionally causing the clock generating circuit to start producing the second clock while the central processing unit is starting preparation for the interruption, so that stabilization of oscillation of the second clock proceeds as the central processing unit is preparing for the interruption.

2. The information processing apparatus according to claim 1, wherein the predetermined condition is present when the central processing circuit completes the preparation for the interruption, and oscillation of the second clock derived from the clock generating circuit becomes stable.

3. The information processing apparatus according to claim 1, wherein the predetermined condition is present when the longer of a time needed for the central processing circuit to complete the preparation for the interruption and a time needed for clock oscillation to become stable elapses.

4. The information processing apparatus according to claim 1, wherein the central processing unit starts processing interruption data at a high speed upon receiving the second clock.

5. The information processing apparatus according to claim 1, wherein the start signal is supplied in parallel to the central processing unit and the clock generating circuit.

6. The information processing apparatus according to claim 1, wherein the central processing unit operates with the first clock during a halt mode and with the second clock during an operational mode, and switching from the halt mode the operational mode takes place while said stabilization of oscillation of the second clock is proceeding.

7. An information processing apparatus that can perform an interruption function comprising:
 a central processing unit adapted to operate with a first clock;
 a clock generating circuit for generating a second clock upon receiving an interrupt request signal, the second clock having a shorter period than the first clock; and
 an interrupt control circuit for storing interruption data in accordance with the second clock, and for supplying a start signal to the central processing unit upon receiving the interrupt request signal, to cause the central processing unit to start preparation for the interruption and feeding the interruption data to the central processing unit after the central processing unit completes the preparation of the interruption such that the central processing data performs the interruption with the interruption data,
 wherein the control processing unit performs the interruption in accordance with the first clock, and
 wherein the clock generating circuit and the interrupt control circuit receive the interrupt request signal at substantially the same time, so that stabilization of oscillation of the second clock proceeds as the central proceeding unit is preparing for the interruption.

8. The information processing apparatus according to claim 7, wherein the interrupt control circuit stores the interruption data after supplying the start signal to the central processing unit.

9. The information processing apparatus according to claim 7, wherein the interrupt request signal is supplied to the clock generating circuit without passing through the interrupt control circuit.

10. The information processing apparatus according to claim 7, wherein the second clock has a short period sufficient not to cause an overflow of the interruption data.

11. The information processing apparatus according to claim 7, wherein the interrupt control circuit stores the interruption data after oscillation of the second clock produced from the clock generating circuit becomes stable.

12. The information processing apparatus according to claim 7, wherein the preparation of the interruption and generation of the second clock are initiated at substantially the same time.

13. The information processing apparatus according to claim 7, wherein the start signal is supplied to the central processing unit at substantially the same time the interrupt request signal is supplied to the clock generating circuit.

14. The information processing apparatus according to claim 7, wherein the central processing unit operates with the first clock during a halt mode and with the second clock during an operational mode, and switching from the halt mode the operational mode takes place while said stabilization of oscillation of the second clock is proceeding.

15. An apparatus comprising:
 central processing means adapted to operate with one of a first clock and a second clock, the second clock having a shorter period than the first clock;
 means for generating the second clock upon receiving a start signal;
 means for normally supplying the first clock to the central processing means to cause the central processing means to operate with the first clock, and for supplying the second clock, instead of the first clock, to the central processing means to cause the central processing means to operate with the second clock when a predetermined condition is present; and
 means for supplying the start signal substantially simultaneously to both the central processing means and the second clock generating means upon receiving an interrupt request signal, the start signal causing the central processing means to start preparation for the interruption and additionally causing the means for generating to start producing the second clock while the central processing means is starting preparation for the interruption, so that stabilization of oscillation of the second clock proceeds as the central processing means is preparing for the interruption.

16. The apparatus according to claim 15, wherein the central processing means operates with the first clock during a halt mode and with the second clock during an operational mode, and switching from the halt mode the operational mode takes place while said stabilization of oscillation of the second clock is proceeding.

17. An apparatus comprising:
 central processing means adapted to operate with a first clock;
 means for generating a second clock upon receiving an interrupt request signal, the second clock having a shorter period than the first clock;
 means for storing interruption data in accordance with the second clock;
 means for supplying a start signal to the central processing means upon receiving the interrupt request signal, to cause the central processing means to start preparation for the interruption; and means for feeding the interruption data to the central processing means after the central processing means completes the preparation of the interruption such that the central processing means performs the interruption with the interruption data in accordance with the first clock, wherein stabilization of oscillation of the second clock proceeds as the central processing means is preparing for the interruption.

18. The apparatus according to claim 17, wherein the means for storing the interruption data stores the interruption data after the means for supplying the start signal supplies the start signal to the central processing means.

19. The apparatus according to claim 17, wherein the central processing means operates with the first clock during a halt mode and with the second clock during an operational mode, and switching from the halt mode the operational mode takes place while said stabilization of oscillation of the second clock is proceeding.

* * * * *